(12) United States Patent
Lee (10) Patent No.: US 11,268,698 B2
(45) Date of Patent: Mar. 8, 2022

(54) COMBUSTOR AND GAS TURBINE INCLUDING THE SAME

(71) Applicant: DOOSAN HEAVY INDUSTRIES & CONSTRUCTION CO., LTD., Changwon-si (KR)

(72) Inventor: Donggon Lee, Seoul (KR)

(*) Notice: Subject to any disclaimer, the term of this patent is extended or adjusted under 35 U.S.C. 154(b) by 514 days.

(21) Appl. No.: 16/166,468

(22) Filed: Oct. 22, 2018

(65) Prior Publication Data

US 2019/0128524 A1    May 2, 2019

(30) Foreign Application Priority Data

Oct. 30, 2017  (KR) .................. 10-2017-0142544

(51) Int. Cl.
  *F23R 3/04* (2006.01)
  *F02C 7/18* (2006.01)

(52) U.S. Cl.
  CPC .............. *F23R 3/04* (2013.01); *F02C 7/18* (2013.01); *F05D 2240/35* (2013.01); *F05D 2260/201* (2013.01); *F23R 2900/03043* (2013.01); *F23R 2900/03044* (2013.01)

(58) Field of Classification Search
  CPC .. F23R 3/002; F23R 3/04; F23R 3/045; F23R 3/02; F23R 3/16; F23R 3/425–46; F23R 3/50–58; F23R 2900/03045; F23M 5/08; F23M 5/085; F02C 7/18; F05D 2240/35; F05D 2260/301
  See application file for complete search history.

(56) References Cited

U.S. PATENT DOCUMENTS

| | | | |
|---|---|---|---|
| 6,122,917 A * | 9/2000 | Senior ............... | F23R 3/002 165/908 |
| 2010/0089468 A1* | 4/2010 | Scott ................ | F01D 17/14 137/468 |
| 2014/0230442 A1* | 8/2014 | Yokota .............. | F23R 3/005 60/760 |
| 2020/0271017 A1* | 8/2020 | Okabe .............. | F23R 3/26 |

FOREIGN PATENT DOCUMENTS

| | | |
|---|---|---|
| JP | 2014-159904 A | 9/2014 |
| KR | 10-2006-0087872 A | 8/2006 |
| KR | 10-1556532 B1 | 10/2015 |
| KR | 10-1770068 B1 | 8/2017 |

* cited by examiner

*Primary Examiner* — Scott J Walthour
*Assistant Examiner* — David P. Olynick
(74) *Attorney, Agent, or Firm* — Harvest IP Law, LLP (57) ABSTRACT

A combustor includes an inner liner forming a combustion chamber; an outer liner surrounding the inner liner to form a cooling passage in which compressed air flows; and a plurality of cooling guides installed around an inner circumferential surface of the outer liner to surround the combustion chamber, each of the cooling guides protruding from the inner circumferential surface to create an impinging jet from the compressed air flowing in the cooling passage. The plurality of cooling guides surrounding the combustion chamber are installed at regular intervals in a flow direction of the compressed air, and are arranged in staggered axial rows. Each cooling guide includes an air guiding surface facing the flow of the compressed air to guide the compressed air toward the inner liner. Accordingly, liner cooling efficiency can be enhanced by more effectively guiding the impinging jet toward the inner liner.

9 Claims, 7 Drawing Sheets

COMBUSTOR AND GAS TURBINE INCLUDING THE SAME

CROSS-REFERENCE TO RELATED APPLICATIONS

This application claims priority to Korean Patent Application No. 10-2017-0142544, filed on Oct. 30, 2017, the disclosure of which is incorporated herein by reference in its entirety.

BACKGROUND OF THE INVENTION

Field of the Invention

Exemplary embodiments of the present disclosure relate to a combustor and a gas turbine including the same.

Description of the Related Art

A gas turbine is a power engine that mixes air compressed in a compressor with fuel for combustion and rotates a turbine using high-temperature gas produced by the combustion. The gas turbine is used to drive a generator, an aircraft, a ship, a train, etc.

This gas turbine typically includes a compressor, a combustor, and a turbine. The compressor sucks and compresses outside air, and then transmits it to the combustor. The air compressed in the compressor is in a high-pressure and high-temperature state. The combustor mixes the compressed air introduced from the compressor with fuel and burns the mixture. Combustion gas produced by the combustion is discharged to the turbine. Turbine blades in the turbine are rotated by the combustion gas, thereby generating power. The generated power is used in various fields, such as generating electric power and driving machines.

The combustor is provided with a combustion duct assembly that transmits high-temperature combustion gas produced in a combustion chamber to the turbine. The combustion duct assembly includes a liner and a transition piece connected to the liner to guide the produced combustion gas to the turbine, and a nozzle part and a head part are installed over the liner.

In this case, the liner has a double-tube structure consisting of an outer liner and an inner liner that has direct contact with hot combustion gas. The liner is typically made of a heat-resistant alloy, the service temperature of which is not very high. Accordingly, methods of cooling the liner are used to deal with the relatively low heat resistance of the liner. Among these methods, impinging jet cooling is representative. Impinging jet cooling is a method of indirectly lowering the temperature of the liner by injecting jets of cooling fluid onto the outer surface of the inner liner.

To this end, the conventional inner liner is provided with a plurality of band-shaped cooling guides, but their cooling efficiency is reduced in the flow direction of compressed air. Therefore, there is a need for countermeasures.

SUMMARY OF THE INVENTION

An object of the present disclosure is to provide a combustor capable of enhancing liner cooling efficiency, and a gas turbine including the same.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a combustor may include an inner liner forming a combustion chamber; an outer liner surrounding the inner liner to form a cooling passage in which compressed air flows; and a plurality of cooling guides installed around an inner circumferential surface of the outer liner to surround the combustion chamber, each of the cooling guides protruding from the inner circumferential surface to create an impinging jet from the compressed air flowing in the cooling passage.

The plurality of cooling guides surrounding the combustion chamber may be installed at regular intervals in a flow direction of the compressed air. The plurality of cooling guides may be installed at regular intervals in a flow direction of the compressed air are arranged in staggered axial rows.

Each cooling guide may include a downstream side having a square cross-section.

Each cooling guide may have a length greater than its height.

Each cooling guide may include an air guiding surface facing the flow of the compressed air to guide the compressed air toward the inner liner. The air guiding surface may include a concave curve.

Each cooling guide may include a top surface extending from a downstream side of the cooling guide to the air guiding surface, and a front surface extending from the inner circumferential surface of the outer liner to the air guiding surface.

The combustor may further include a guide passage extending from the front surface to the top surface and including through-ports respectively communicating with the front surface and the top surface to pass compressed air through the guide passage separately from the compressed air guided toward the inner liner by the air guiding surface. The top surface may be wider than the front surface such that the cooling guide is narrower on the upstream side and wider on the downstream side. The air guiding surface may communicate with the top surface such that the top surface has an axial length and may communicate with the front surface such that the front surface has a radial height, and wherein the axial length and the radial height are substantially equal. Here, the axial length and the radial height are each substantially zero, and the air guiding surface may be planar.

The air guiding surface may include a recess having a structure in alignment with a flow direction of the compressed air, and the combustor may further include a wall protruding from either side of the recess, the wall extending from a top surface of the cooling guide to a front surface of the cooling guide.

In accordance with another aspect of the present disclosure, there is provided a gas turbine including a compressor to compress air, a combustor to produce combustion gas by mixing the compressed air with fuel for combustion in a combustion chamber, and a turbine rotated by the combustion gas to generate power. The combustor of the gas turbine is consistent with the combustor as described above.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

The present disclosure may be subjected to various modifications and have various embodiments. Specific embodiments are illustrated in the drawings and will be described in the detailed description of the present disclosure. However, this is not intended to limit the present disclosure to specific embodiments. It should be understood that the present disclosure includes all modifications, equivalents or replacements that fall within the spirit and technical range of the present disclosure, and the scope of the present disclosure is not limited to the following embodiments.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Exemplary embodiments of the present disclosure will be described below in more detail with reference to the accompanying drawings. Throughout the disclosure, like reference numerals refer to like parts throughout the various figures and embodiments of the present disclosure. In certain embodiments, detailed descriptions of functions and configurations well known in the art may be omitted to avoid obscuring appreciation of the disclosure by a person of ordinary skill in the art. For the same reason, some components may be exaggerated, omitted, or schematically illustrated in the accompanying drawings.

The thermodynamic cycle of a gas turbine ideally follows a Brayton cycle. The Brayton cycle consists of four phases including isentropic compression (adiabatic compression), isobaric heat addition, isentropic expansion (adiabatic expansion), and isobaric heat dissipation. In other words, in the Brayton cycle, thermal energy is released by combustion of fuel in an isobaric environment after the atmospheric air is sucked and compressed to a high pressure, hot combustion gas is expanded to be converted into kinetic energy, and exhaust gas with residual energy is then discharged to the atmosphere. The Brayton cycle consists of four processes, i.e., compression, heating, expansion, and exhaust. The gas turbine using the above Brayton cycle includes a compressor, a combustor, and a turbine.

Figure 1:
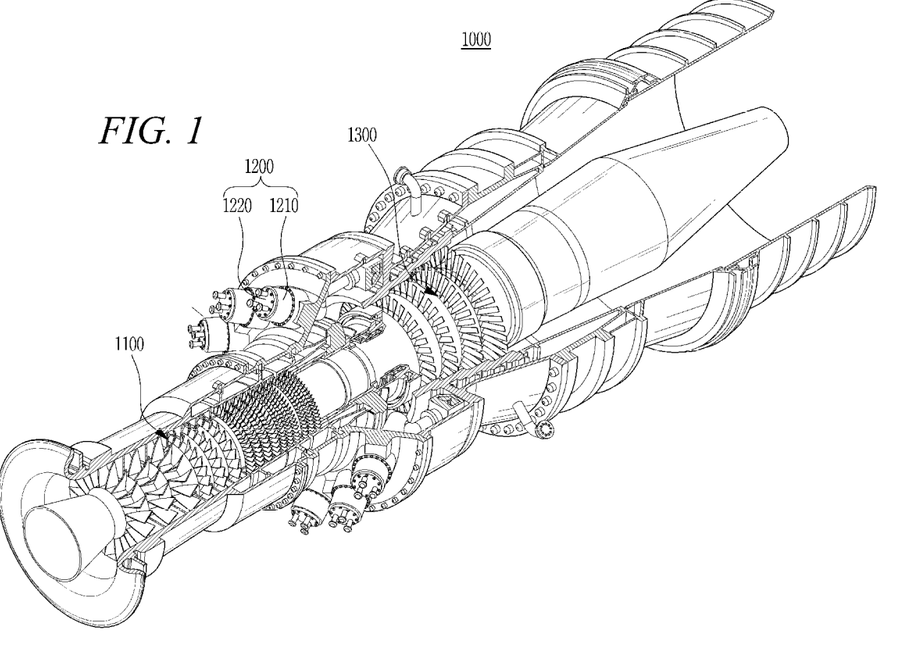
FIG. 1 is a cutaway perspective view of a gas turbine including a combustor according to an embodiment of the present disclosure.
Figure 2:
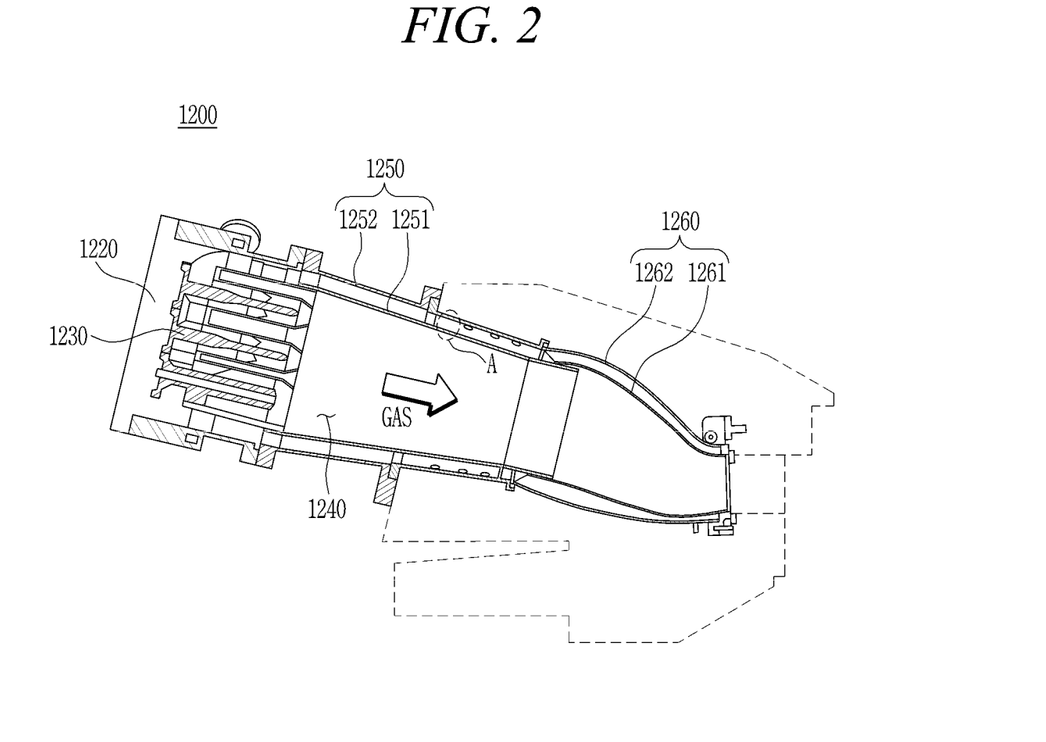
FIG. 2 is a cross-sectional view illustrating the combustor of FIG. 1.

FIG. 1 illustrating the structure of a gas turbine according to an embodiment of the present disclosure. FIG. 2 illustrates the combustor of FIG. 1.

Referring to FIG. 1, a compressor 1100 of a gas turbine 1000 serves to suck and compress air, and mainly serves to supply cooling air to a high-temperature region required for cooling in the gas turbine 1000 while supplying combustion air to a combustor 1200. Since the air sucked into the compressor 1100 is subject to an adiabatic compression process, the pressure and temperature of the air passing through the compressor 1100 increase. The compressor 1100 of the large gas turbine 1000 as in FIG. 1 is a multistage axial compressor configured such that a large amount of air is compressed to a desired compression ratio while passing through each stage.

The combustor 1200 mixes the compressed air, which is supplied from the outlet of the compressor 1100, with fuel for isobaric combustion to produce high-energy combustion gas (GAS). The combustor 1200 is disposed downstream of the compressor 1100 and includes a plurality of igniters 1220 arranged along an annular combustor casing 1210. Each of the igniters 1220 includes a plurality of fuel injectors 1230, and the fuel supplied from the fuel injectors 1230 is mixed with air at an appropriate rate to be suitable for combustion.

The gas turbine 1000 may use gas fuel, liquid fuel, or composite fuel combining them. It is important to make a combustion environment for reducing an amount of emission such as carbon monoxide or nitrogen oxide that is subject to legal regulations. Accordingly, pre-mixed combustion has been increasingly used in recent years in that it can accomplish uniform combustion to reduce emission by lowering a combustion temperature even though it is relatively difficult to control combustion.

In the pre-mixed combustion, compressed air is mixed with the fuel injected from the fuel injectors 1230 and then introduced into a combustion chamber 1240. When combustion is stable after pre-mixed gas is initially ignited by the igniter 1220, the combustion is maintained by the supply of fuel and air.

The combustor 1200 needs to be suitably cooled since it operates at the highest temperature in the gas turbine 1000. Especially, a turbine inlet temperature (TIT) is very important in the gas turbine 1000 because the efficiency of the gas turbine 1000 is typically increased as the turbine inlet temperature becomes high. In addition, the increase of the turbine inlet temperature is advantageous for gas turbine combined power generation. For this reason, the gas turbine 1000 is also classified based on the turbine inlet temperature.

Ultimately, the temperature of combustion gas must be increased to increase the turbine inlet temperature. Accordingly, it is important that a combustion duct assembly, which forms the combustion chamber 1240 and passage of the combustor 1200 for the flow of hot combustion gas, be designed to be made of a high heat-resistant material and desirably cooled.

Referring to FIG. 2, the combustion duct assembly includes a liner 1250 and a transition piece 1260 and connects the combustor 1200 to a turbine 1300. That is, the liner 1250 is connected to the combustor 1200 and the transition piece 1260 is connected to the turbine 1300, with the liner 1250 and the transition piece 1260 connected to each other. The liner 1250 is a tubular member that defines the space of the combustion chamber 1240. While hot combustion gas (GAS) flows through the combustion duct assembly to the turbine 1300, compressed air flows along an outer surface of the combustion duct and is supplied to the fuel injectors 1230. In this process, the combustion duct assembly heated by the hot combustion gas is properly cooled.

In more detail, the liner 1250 may consist of an inner liner 1251 and an outer liner 1252, with the inner liner 1251 in direct contact with the hot combustion gas (GAS) in the combustion chamber 1240. Here, the inner and outer liners 1251 and 1252 are separated from each other by a predetermined distance. To guide the hot combustion gas to the turbine 1300, the transition piece 1260 may consist of an inner transition piece 1261 and an outer transition piece 1262, with the inner transition piece 1261 similarly in direct contact with the hot combustion gas. Thus, the combustion duct assembly has a double-walled structure in which an annular space (combustion duct) is formed between the inner and outer transition pieces 1261 and 1262 and between the inner and outer liners 1251 and 1252. Meanwhile, since the liner 1250 is fixed to the combustor 1200 and the transition piece 1260 is fixed the turbine 1300, an intermediate connection between the inner liner 1251 and the transition piece 1260 is subject to the stresses and effects of thermal expansion, such as diameter elongation, so the intermediate connection may include an elastic support (not shown). In order to cool the inner liner 1251 and the inner transition piece 1260, compressed air enters and permeates the annular space by, for example, penetrating the outer transition piece 1262 upstream of the cooling effect.

Figure 3:
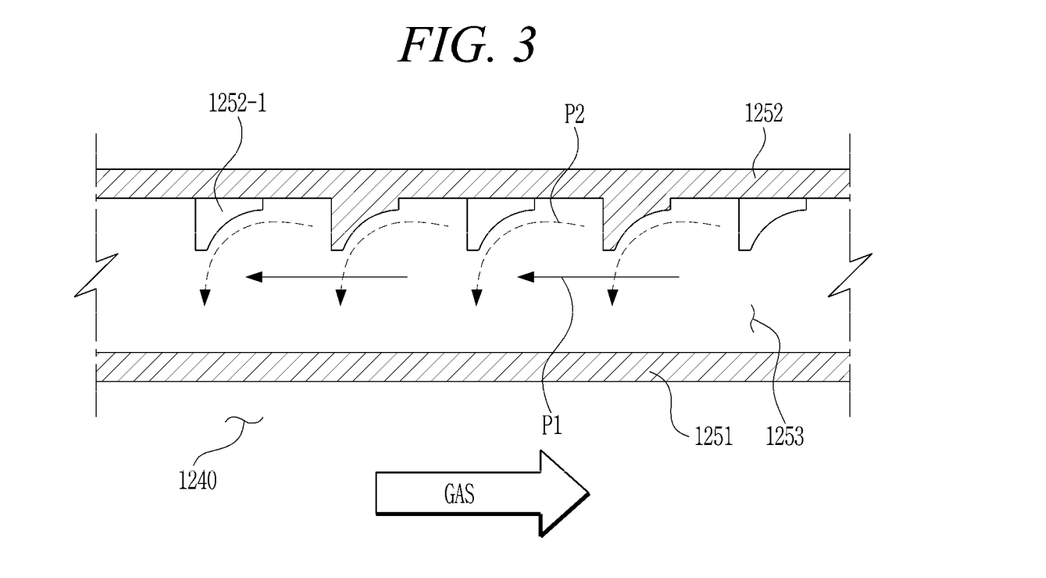
FIG. 3 is an enlarged view of a section "A" of FIG. 2.
Figure 4:
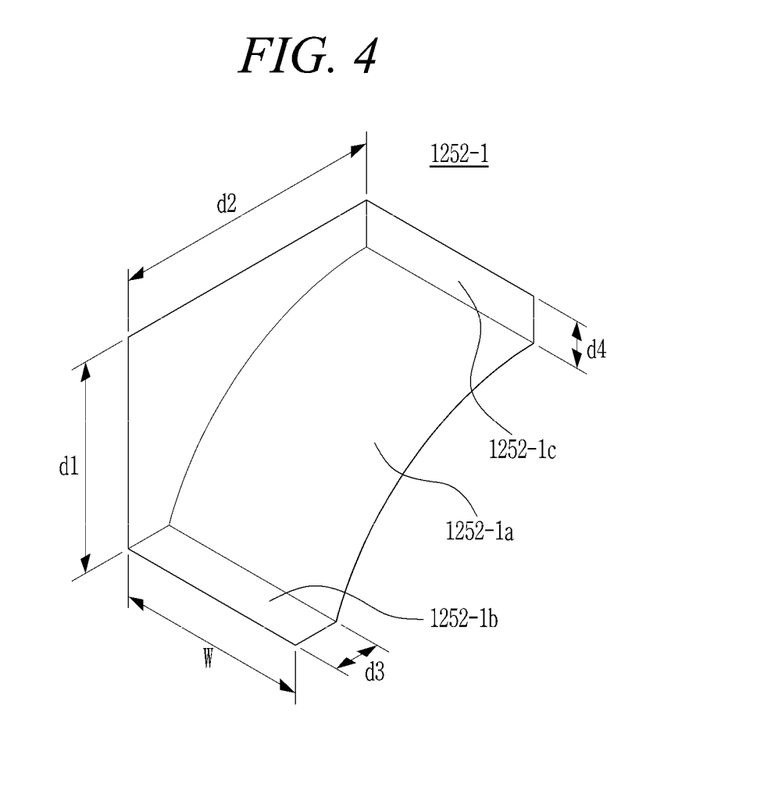
FIG. 4 is a perspective view illustrating one of the cooling guides of FIG. 3 according to an embodiment of the present disclosure.
Figure 5:
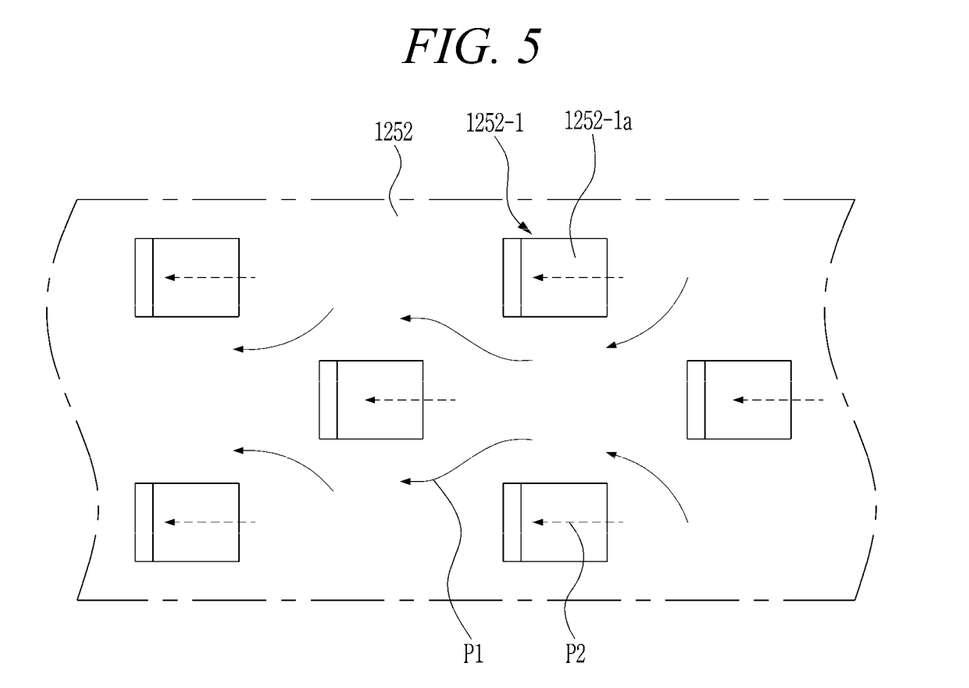
FIG. 5 is a plan view of the inner surface of the outer liner of FIG. 3.

FIG. 3 is an enlarged view of section "A" of FIG. 2, illustrating a plurality of cooling guides installed in a combustor according to an embodiment of the present disclosure. FIG. 4 illustrates one of the cooling guides, and FIG. 5 illustrates an arrangement of the cooling guides on the inner surface of the outer liner.

Referring to FIG. 3, the annular space formed by the outer liner 1252 surrounding the inner liner 1251 is a cooling passage 1253 for the flow of compressed air P1 introduced into the annular space through inlet holes (not shown), which may be formed in the outer liner 1252. Thus, the cooling passage 1253 is disposed between the inner and outer liners 1251 and 1252, while the inner liner 1251 is in direct contact with hot combustion gas (GAS) produced in the combustion chamber 1240 so that heat is directly transferred from the combustion gas to the inner liner 1251.

The air introduced into the cooling passage 1253 through the inlet holes may be compressed air supplied from the compressor 1100 of the gas turbine. The liner 1250 may be included within a casing can (not shown) and the compressed air produced in the compressor may be introduced into the casing can and then introduced into the cooling passage 1253 through the inlet holes while flowing along the outer surface of the liner 1250. The cooling air introduced into the cooling passage 1253 comes into contact with and flows across the inner liner 1251 thereby cooling the inner liner 1251.

In this case, a plurality of cooling guides 1252-1 may be provided around an inner circumferential surface of the outer liner 1252, preferably to surround the combustion chamber 1240 as a circumferential row of cooling guides 1252-1. Each of the cooling guides 1252-1 protrudes from the inner circumferential surface of the outer liner 1252 to create an impinging jet from the stream of compressed air P1 flowing in the cooling passage 1253. Here, the impinging jets are effected by a jet portion P2 of the compressed air P1. The plurality of cooling guides 1252-1 surrounding the combustion chamber 1240 are preferably installed on the inner surface of the outer liner 1252 so as to occur at regular intervals in the flow direction of the compressed air P1. The arrangement of the cooling guides 1252-1 so as to occur at regular intervals in the flow direction of the compressed air P1 in turn arranges the cooling guides 1252-1 in axial rows.

As illustrated in FIG. 4, each of the cooling guides 1252-1 includes an air guiding surface 1252-1a facing the flow of compressed air P1 to guide the portion P2 of the compressed air P1 toward the inner liner 1251. In particular, in the embodiment of FIG. 4, the air guiding surface 1252-1a includes a concave curve for smoothly guiding the compressed air P2 toward the inner liner 1251. In this case, it is preferable that the cooling guide 1252-1 have a length (d2) greater than its height (d1) so as to reduce a flow resistance in order to thwart vibration, noise, etc. It is further preferable that the cooling guide 1252-1 include a downstream side having a square cross-section whereby the width (W) is substantially equal to the height (d1).

According to an embodiment, each of the cooling guides 1252-1 may include a top surface 1252-1b extending from the downstream side of the cooling guide 1252-1 to the air guiding surface 1252-1a, and a front surface 1252-1c extending from the inner surface of the outer liner 1252 to the air guiding surface 1252-1a. Here, it is preferable that the air guiding surface 1252-1a communicates with the top surface 1252-1b such that the top surface 1252-1b has an axial length (d3) and communicates with the front surface 1252-1c such that the front surface 1252-1c has a radial height (d4). According to the embodiment, the axial length (d3) is substantially equal to the radial height (d4).

As illustrated in FIG. 5, the plurality of cooling guides 1252-1 may be arranged in a staggered formation whereby one axial row of the cooling guides 1252-1 includes cooling guides 1252-1 that are not aligned with the cooling guides 1252-1 of an adjacent axial row. This staggered formation of axial rows serves to reduce the occurrence of interrupted flow of compressed air P1 next to the inner circumferential surface of the outer liner 1252.

Figure 6:
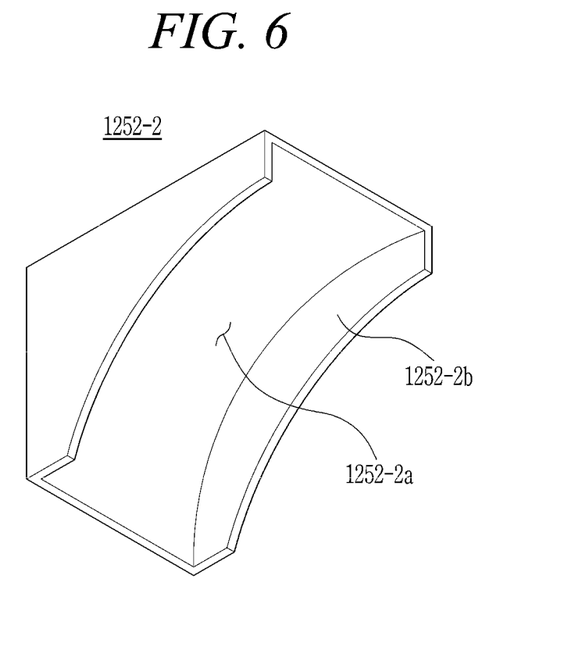
FIG. 6 is a perspective view illustrating a first modified example of the cooling guide of FIG. 4.

FIG. 6 illustrates a first modified example of a cooling guide as in FIG. 4. Referring to FIG. 6, a cooling guide 1252-2 may include a recess 1252-2a including a curved surface facing the flow of compressed air P1 to guide a portion P2 of the compressed air P1 toward the inner liner 1251. Thus, the recess 1252-2a has a structure in alignment with the flow direction of the compressed air P1. Further, the cooling guide 1252-2 has an opposing pair of walls 1252-2b erected at both sides of the recess 1252-2a and protruding toward the flow direction of the compressed air P1, thereby enabling the portion P2 of the compressed air P1 to be more stably guided toward the inner liner 1251. According to an embodiment, the walls 1252-2b each extend from a top surface (1252-1b) of the cooling guide 1252-2 to a front surface (1252-1c) of the cooling guide 1252-2.

Figure 7:
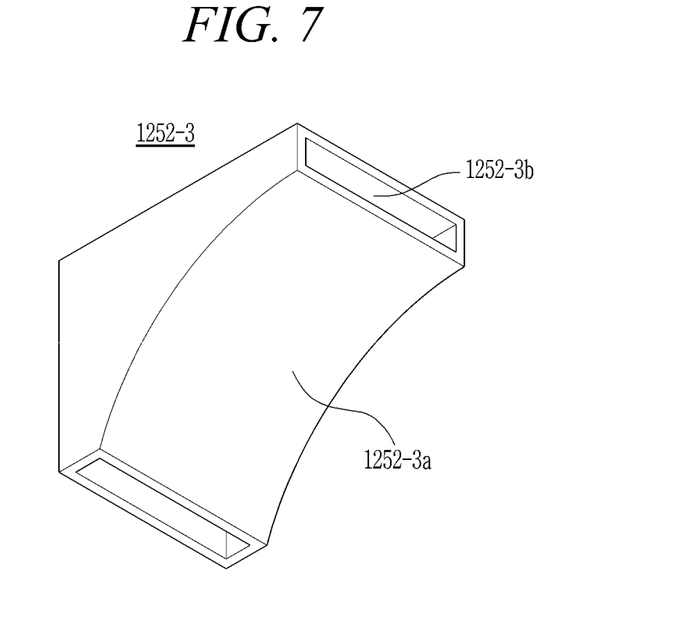
FIG. 7 is a perspective view illustrating a second modified example of the cooling guides of the FIG. 4.

FIG. 7 illustrates a second modified example of a cooling guides of FIG. 4. Referring to FIG. 7, a cooling guide 1252-3 may include an air guiding surface 1252-3a facing the flow of compressed air P1 and through-ports 1252-3b separated from the air guiding surface 1252-3a and open at both ends to form a guide passage. The air guiding surface 1252-3a may include a concave curve for smoothly guiding the compressed air P2 toward the inner liner 1251. Thus, a portion P2 of the compressed air P1 may be divided into two flows and guided toward the inner liner 1251. Therefore, it is possible to enhance a cooling effect on the inner liner 1251 by guiding the portion P2 of the compressed air P1 toward the inner liner 1251 with less loss.

Figure 8:
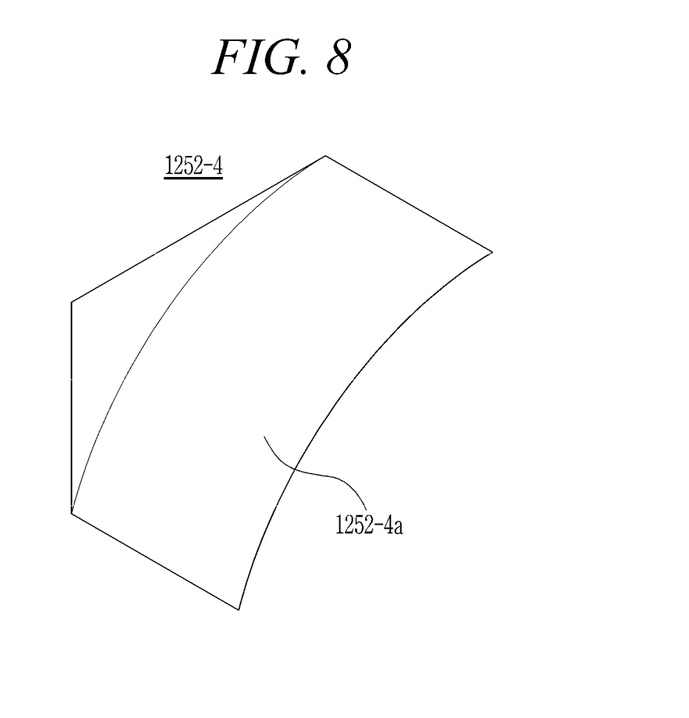
FIG. 8 is a perspective view illustrating a third modified example of the cooling guide of FIG. 4.

FIG. 8 illustrates a third modified example of a cooling guide of FIG. 3. A cooling guide 1252-4 as illustrated in FIG. 8 may include an air guide surface 1252-4a having a curved structure. Here, the top and front surfaces 1252-1b and 1252-1c as in FIG. 4 are eliminated to form the cooling guide 1252-4 of FIG. 8. In other words, the cooling guide 1252-4 preferably has a structure such that the axial length (d3) and radial height (d4) are each effectively zero.

Figure 9:
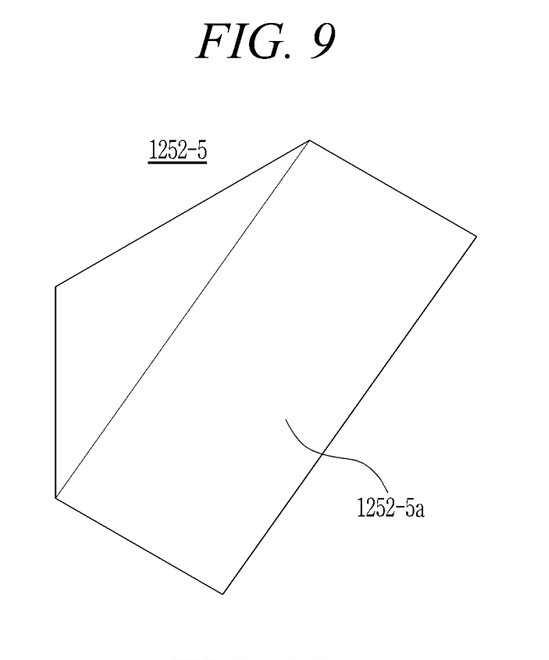
FIG. 9 is a perspective view illustrating a fourth modified example of the cooling guide of FIG. 4.

FIG. 9 illustrates a fourth modified example of a cooling guide of FIG. 3. A cooling guide 1252-5 as illustrated in FIG. 9 may include an air guiding surface 1252-5a having a planar structure. Here, the curved structure of the air guide surface 1252-4a as in FIG. 8 is eliminated to form the cooling guide 1252-5 of FIG. 9.

Figure 10:
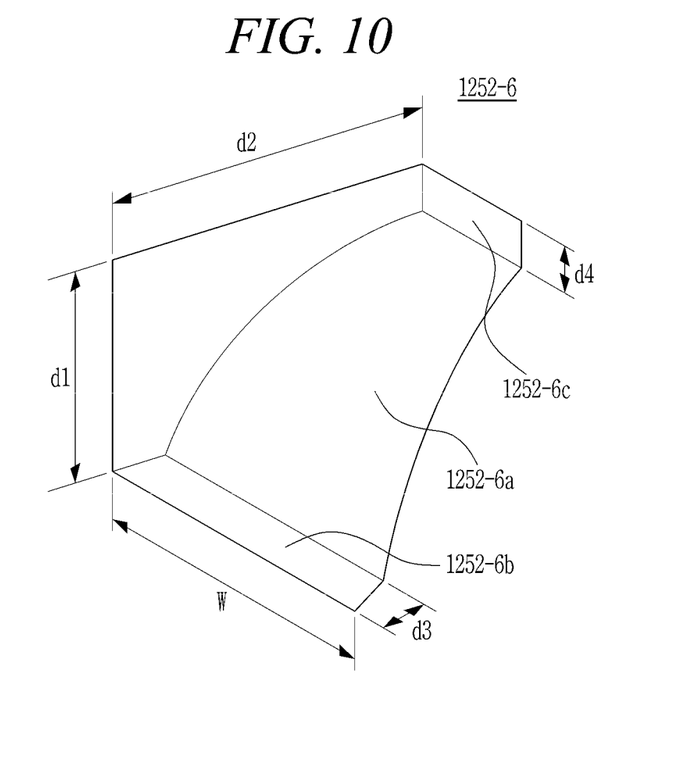
FIG. 10 is a perspective view illustrating a fifth modified example of the cooling guide of FIG. 4.
Figure 11:
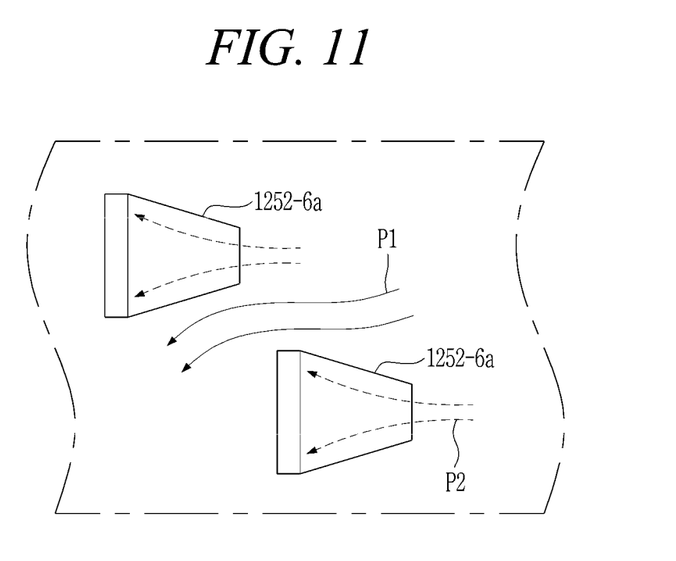
FIG. 11 is a plan view of the inner surface of the outer liner of FIG. 3 in which the cooling guide of FIG. 10 is installed.

FIG. 10 illustrates a fifth modified example of a cooling guide of FIG. 4. FIG. 11 illustrates an arrangement of the cooling guides on the inner surface of the outer liner, according to the modification of FIG. 10.

As illustrated in FIG. 10, a cooling guide 1252-6 includes an air guiding surface 1252-6a facing the flow of compressed air P1 to guide a portion P2 of the compressed air P1 toward the inner liner 1251. The air guiding surface 1252-6a may include a concave curve for smoothly guiding the compressed air P2 toward the inner liner 1251. The cooling guide 1252-6 has a structure substantially the same as the cooling guide 1252-1 of FIG. 4, except that the upstream side of the cooling guide 1252-6 is narrower than the downstream side. That is, as in the embodiment of FIG. 4, the cooling guide 1252-6 may have a length (d2) greater than its height (d1) so as to reduce a flow resistance in order to thwart vibration, noise, etc. and may include a downstream side having a square cross-section whereby the width (W) is substantially equal to the height (d1), and the cross-section of the cooling guide 1252-6 decreases in size toward the flow of the compressed air. Further, each of the cooling guides 1252-6 may include a top surface 1252-6b extending from the downstream side to the air guiding surface 1252-6a, and a front surface 1252-6c extending from the inner surface of the outer liner 1252 to the air guiding surface 1252-6a, such that the air guiding surface 1252-6a communicates with the top surface having an axial length (d3) and communicates with the front surface having a radial height (d4) substantially equal to the radial height.

In this case, however, the top surface 1252-6b is wider than the front surface 1252-6c. In other words, the cooling guide 1252-6 being narrower on the upstream side and wider on the downstream side further serves to reduce a flow resistance in order to thwart vibration, noise, etc.

As illustrated in FIG. 11, a plurality of cooling guides 1252-6 may be arranged as in FIG. 5. That is, the plurality of cooling guides 1252-6 may be arranged in a staggered formation whereby one axial row of the cooling guides 1252-6 includes cooling guides 1252-6 that are not aligned with the cooling guides 1252-1 of an adjacent axial row. This staggered formation of axial rows serves to reduce the occurrence of interrupted flow of compressed air P1 next to the inner circumferential surface of the outer liner 1252.

The high-temperature and high-pressure combustion gas produced in the combustor 1200 is supplied to the turbine 1300 through the combustion duct assembly. In the turbine 1300, the thermal energy of combustion gas is converted into mechanical energy to rotate a rotary shaft by applying impingement and reaction force to a plurality of blades radially arranged on the rotary shaft of the turbine 1300 through the adiabatic expansion of the combustion gas. Some of the mechanical energy obtained from the turbine 1300 is supplied as energy required for compression of air in the compressor, and the remainder is used as effective energy required for driving a generator to produce electric power or the like.

The gas turbine 1000 is advantageous in that consumption of lubricant is extremely low due to the absence of mutual friction parts such as a piston-cylinder since it does not have main reciprocating components, the amplitude, which is a characteristic of reciprocating machines, is greatly reduced, and it enables high-speed motion.

The thermal efficiency in the Brayton cycle is increased as a compression ratio related to compression of air becomes high and the temperature of combustion gas (turbine inlet temperature) introduced in the above-mentioned isentropic expansion process becomes high. Therefore, the gas turbine 1000 is also progressing in a direction of increasing the compression ratio and the temperature at the inlet of the turbine 1300.

As described above, the combustor and the gas turbine including the same according to the present disclosure have an advantage of being capable of enhancing liner cooling efficiency by more effectively guiding the impinging jet to the inner liner.

As is apparent from the above description, the combustor and the gas turbine including the same according to the present disclosure have an advantage of being capable of enhancing liner cooling efficiency by more effectively guiding the impinging jet to the inner liner.

While the specific embodiments have been described with reference to the drawings, the present disclosure is not limited thereto. It will be apparent to those skilled in the art that various changes and modifications may be made without departing from the spirit and scope of the disclosure as defined in the following claims.

What is claimed is:

1. A combustor comprising:
    an inner liner forming a combustion chamber;
    an outer liner surrounding the inner liner to form a cooling passage in which compressed air flows; and
    a plurality of cooling guides installed around an inner circumferential surface of the outer liner to surround the combustion chamber, each of the plurality of cooling guides including an air guiding surface and protruding from the inner circumferential surface to create an impinging jet from the compressed aft flowing in the coding passage,
    wherein the air guiding surface includes a concave surface that faces the flow of the compressed air to guide the compressed air toward the inner liner, and
wherein each of the plurality of cooling guides includes a downstream side surface having a square cress-section and extending perpendicularly from the inner circumferential surface of the outer liner, a top surface extending from the downstream side surface to the air guiding surface, a front surface extending perpendicularly from the inner circumferential surface of the outer liner to the air guiding surface, and two side surfaces that each has a flat surface and meets the downstream side surface, the top surface, the front surface, the inner circumferential surface of the outer liner and the air guiding surface.

2. The combustor according to claim 1, wherein the plurality of cooling guides surrounding the combustion chamber are installed at regular intervals in a flow direction of the compressed air.

3. The combustor according to claim 2, wherein the plurality of cooling guides installed at regular intervals in the flow direction of the compressed air are arranged in staggered axial rows.

4. The combustor according to claim 1, wherein each coaling guide of the plurality of cooling guides has a length dimension measured from a downstream side of a corresponding cooling guide of the plurality of cooling guides to the front surface of the corresponding cooling guide, and a height dimension measured from the inner circumferential surface of the outer liner to the top surface of the corresponding cooling guide, the length dimension being greater than the height dimension.

5. The combustor according to claim 1, wherein each cooling guide of the plurality of cooling guides has an upstream side that faces the flow of the compressed air and is disposed opposite to a downstream side, and wherein the top surface is wider than the front surface such that a corresponding cooling guide of the plurality of cooling guides is narrower on the upstream side and wider on the downstream side.

6. The combustor according to claim 1, wherein the aft guiding surface communicates with the top surface such that the top surface has an axial length measured from the air guiding surface to a right angle junction between the top surface and the downstream side surface and communicates with the front surface such that the front surface has a radial height measured from the air guiding surface to a right angle junction between the front surface and the inner circumferential surface of the outer liner, and wherein the axial length and the radial height are substantially equal.

7. A gas turbine comprising:
a compressor to compress air, a combustor to produce combustion gas by mixing the compressed air with fuel for combustion in a combustion chamber, and a turbine rotated by the combustion gas to generate power, the combustor comprising:
an inner liner forming the combustion chamber;
an outer liner surrounding the inner liner to form a cooling passage in which the compressed air flows; and
a plurality of cooling guides installed around an inner circumferential surface of the outer liner to surround the combustion chamber, each of the plurality of cooling guides including an air guiding surface and protruding from the inner circumferential surface to create an impinging jet from the compressed air flowing in the cooling passage,
wherein the air guiding surface includes a concave surface that faces the flow of the compressed air to guide the compressed air toward the inner liner, and
wherein each of the plurality of cooling guides includes a downstream side surface having a square cross-section and extending perpendicularly from the inner circumferential surface of the outer liner, a top surface extending from the downstream side surface to the air guiding surface, a front surface extending perpendicularly from the inner circumferential surface of the outer liner to the air guiding surface, and two side surfaces that each has a flat surface and meets the downstream side surface, the top surface, the front surface, the inner circumferential surface of the outer liner and the air guiding surface.

8. The gas turbine according to claim 7, wherein the plurality of cooling guides surrounding the combustion chamber are installed at regular intervals in a flow direction of the compressed air, and wherein the plurality of cooling guides installed at the regular intervals in the flow direction of the compressed air are arranged in staggered axial rows.

9. The gas turbine according to claim 7, wherein the aft guiding surface communicates with the top surface such that the top surface has an axial length measured from the air guiding surface to a right angle junction between the top surface and the downstream side surface and communicates with the front surface such that the front surface has a radial height measured from the air guiding surface to a right angle junction between the front surface and the inner circumferential surface of the outer liner, and
wherein the axial length and the radial height are substantially equal.

* * * * *